United States Patent
Nakagawa et al.

(10) Patent No.: US 7,532,426 B2
(45) Date of Patent: May 12, 2009

(54) METHOD FOR ERASE PROCESS ON RECORDING SURFACE OF DISK AND DISK DRIVE APPARATUS

(75) Inventors: Takahiro Nakagawa, Kanagawa (JP); Toshiaki Satoh, Kanagawa (JP); Hiroshi Fukuyama, Kanagawa (JP); Kyo Akagi, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 86 days.

(21) Appl. No.: 11/786,446

(22) Filed: Apr. 10, 2007

(65) Prior Publication Data

US 2007/0258162 A1    Nov. 8, 2007

(30) Foreign Application Priority Data

Apr. 11, 2006    (JP)    ............................. 2006-108895

(51) Int. Cl.
*G11B 5/03*    (2006.01)
*G11B 5/596*    (2006.01)
(52) U.S. Cl. .................... 360/66; 360/77.02; 360/78.04
(58) Field of Classification Search ........................ None
See application file for complete search history.

(56) References Cited

U.S. PATENT DOCUMENTS

| 6,185,058 | B1  |   | 2/2001 | Dobbek et al. |         |
|-----------|-----|---|--------|---------------|---------|
| 6,507,448 | B2  | * | 1/2003 | Nishida et al.| 360/66  |
| 6,564,307 | B1  | * | 5/2003 | Micka et al.  | 711/156 |
| 6,999,257 | B2  |   | 2/2006 | Takeo         |         |
| 2002/0034031 | A1 | * | 3/2002 | Sakai       | 360/46  |

FOREIGN PATENT DOCUMENTS

| JP | 2002-230734 |   | 8/2002  |
| JP | 07-302404   | * | 11/2005 |

* cited by examiner

*Primary Examiner*—Andrew L Sniezek
(74) *Attorney, Agent, or Firm*—Townsend and Townsend and Crew LLP; Patrick Duncan

(57) ABSTRACT

Embodiments in accordance with the present invention erase a desired area on a recording surface of disk or disk drive apparatus. According to an embodiment, a hard disk drive (HDD) performs erase on a recording surface by moving a head element unit at one-half a servo track pitch with reference to a servo address. Before actual erase is started on the recording surface, the HDD generates a management table configured based on servo addresses from a management table configured based on data tracks. At an erase process, the HDD sets parameters in accordance with the zone and skips a management area with reference to this management table based on the servo addresses.

14 Claims, 8 Drawing Sheets

Fig. 6(a)

| [ ZONE BOUNDARY TABLE (DATA TRACK) ] ||
|---|---|
| ZONE NUMBER | MAXIMUM DATA·TRACK NUMBER |
| ZONE_0 | DATA TRACK_0 |
| ZONE_1 | DATA TRACK_1 |
| ⋮ | ⋮ |
| ZONE_N | DATA TRACK_N |

Fig. 6(b)

| [ ZONE BOUNDARY TABLE (SERVO TRACK) ] ||
|---|---|
| ZONE NUMBER | MAXIMUM DATA·TRACK NUMBER |
| ZONE_0 | SERVO TRACK_0 |
| ZONE_1 | SERVO TRACK_1 |
| ⋮ | ⋮ |
| ZONE_N | SERVO TRACK_N |

Fig. 7

| [ MANAGEMENT AREA TABLE (SERVO TRACK) ] ||
|---|---|
| MANAGEMENT AREA BOUNDARY | SERVO TRACK NUMBER |
| ID | SERVO TRACK_ID |
| OD | SERVO TRACK_OD |

Fig. 8

| [ ZONE PARAMETER TABLE ] ||
|---|---|
| ZONE NUMBER | PARAMETER SET |
| ZONE_0 | SET_0 |
| ZONE_1 | SET_1 |
| ⋮ | ⋮ |
| ZONE_N | SET_N |

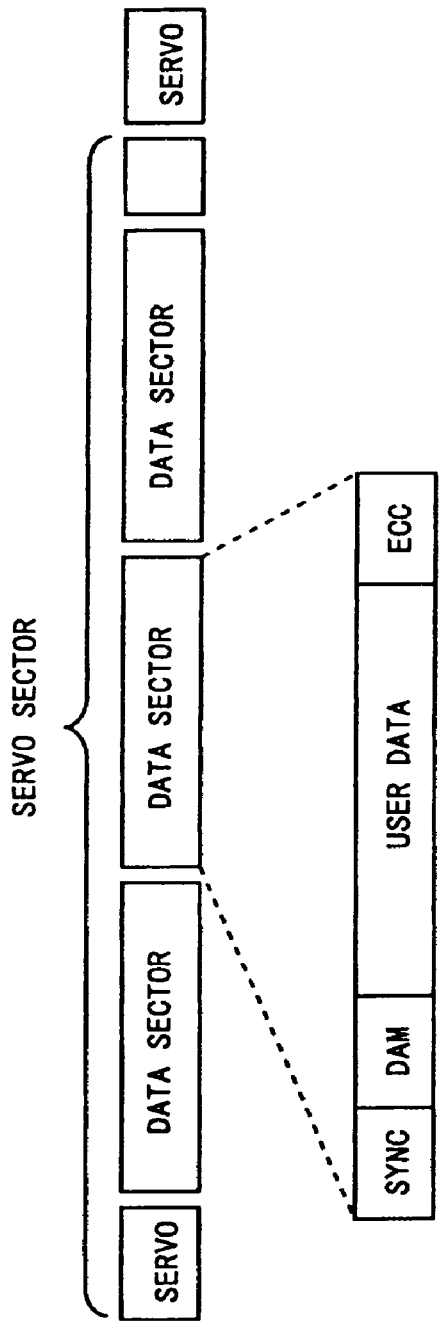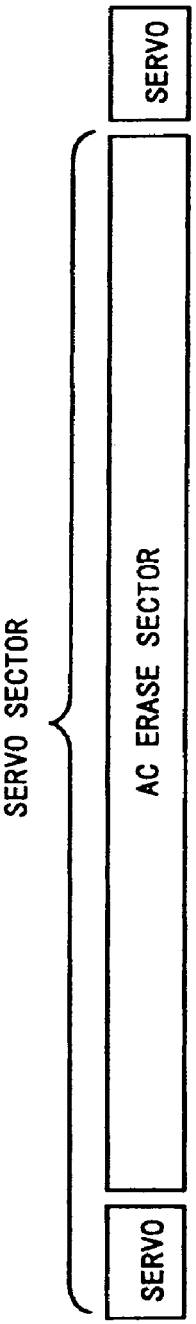
Fig. 9(a)
Fig. 9(b)

METHOD FOR ERASE PROCESS ON RECORDING SURFACE OF DISK AND DISK DRIVE APPARATUS

CROSS-REFERENCE TO RELATED APPLICATION

The instant nonprovisional patent application claims priority to Japanese Application No. 2006-108895, filed Apr. 11, 2006 and incorporated by reference in its entirety herein for all purposes.

BACKGROUND OF THE INVENTION

Apparatus utilizing various types of media such as optical disks, magneto-optical disks, and flexible magnetic disks are known as disk drive apparatus. Among such apparatuses, hard disk drives (HDDs) have widely spread as storage devices for computers and have become one of indispensable storage devices in current computer systems. Further, thanks to their advantageous characteristics, the use of HDDs is increasing in various fields such as movie image recording/reproducing apparatus, car navigation systems, and removable memories used with digital cameras, and computers.

An HDD for recording and reproducing data with a head element unit exercises positioning control over the head element unit based on servo data formed on a magnetic disk. Each of the tracks concentrically formed on a magnetic disk, has a plurality of servo sectors, and each of the servo sectors is constituted by servo data and user data.

A goal in developing HDDs is to provide an increased capacity for data storage capacity. The perpendicular magnetic recording method has been proposed as a technique for improving the recording density of a magnetic disk. According to the perpendicular magnetic recording method, recording is performed with recording magnetization oriented in a direction perpendicular to a recording surface. perpendicular magnetic recording allows high stability of recording to be achieved at a high recording density because magnetic fields are subjected to a low degree of demagnetization by adjacent magnetic domains as the recording density increases unlike that in in-plane magnetic recording in which the direction of recording magnetization is parallel to a recording surface.

In the case of perpendicular magnetic recording, however, it is known that a DC erase area (DC magnetized area) on a recording surface adversely affects data reading performed by a read element. A magnetic field in the DC erase area constitutes a disturbance to the read element, and the SER of a read signal is significantly decreased. Under the circumstance, it is proposed in Japanese Laid-Open Patent No. 2002-230734 ("Patent Document 1") to perform AC erase on a user area as whole including areas between data tracks.

When a DC erase area exists between data tracks, a magnetic field from that area constitutes a disturbance to the read element, which results in a significant reduction in SER (Soft Error Ratio). Therefore, it is specifically proposed to perform AC erase (AC magnetization) on such an area using a servo writer before servo data is written or at a process of writing servo data on a recording surface.

However, when a servo write process employs self servo write, AC erase may be disabled before the servo write or during the servo write process. Self servo write is to write a pattern using a head element unit of an HDD and to write a new pattern by positioning and timing the head element unit while reading the pattern with the head element unit.

A timing pulse to serve as a reference for the write timing measurement and a radial pattern for positioning the head element unit are written on the recording surface by the self servo write, but accurate detection of those patterns is sometimes disabled by magnetization of their surroundings on which AC erase has been performed. It is required to perform AC erase in a desired area of a recording surface not only when a servo write technique is used but also when an AC erase process is performed on the recording surface after writing servo data on the recording surface.

BRIEF SUMMARY OF THE INVENTION

Embodiments in accordance with the present invention erase a desired area on a recording surface of a disk or disk drive apparatus. In the particular embodiment shown in FIG. 1, an HDD 1 performs an erase on a recording surface by moving a head element unit 12 at one-half a servo track pitch with reference to a servo address. Before an actual erase is started on the recording surface, the HDD 1 generates a management table configured based on servo addresses from a management table configured based on data tracks. At an erase process, the HDD 1 sets parameters in accordance with the zone and skips a management area with reference to this management table based on the servo addresses.

BRIEF DESCRIPTION OF THE DRAWINGS

FIGS. 6(a) and 6(b) show examples of a zone boundary table based on data tracks and a zone boundary table based on servo tracks in accordance with embodiments of the present invention.

FIG. 7 shows an example of a management area table based on servo tracks in accordance with embodiments of the present invention.

FIG. 8 shows an example of a zone parameter table in accordance with embodiments of the present invention.

FIGS. 9(a) and 9(b) are schematic illustrations showing a state of erase using one servo sector as a unit in accordance with an embodiment of the present invention.

DETAILED DESCRIPTION OF THE INVENTION

Figure 1:
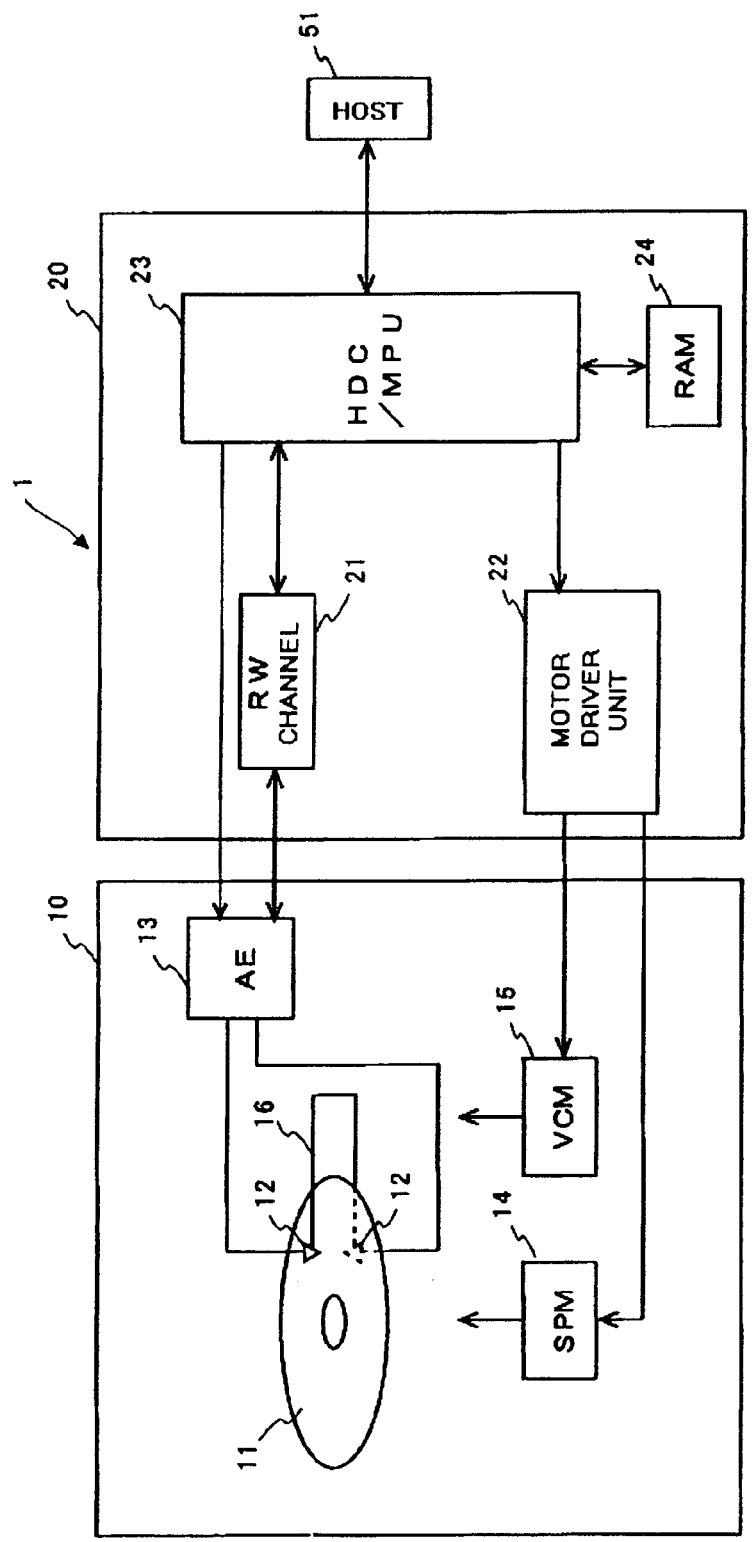
FIG. 1 is a block diagram schematically showing a general configuration of an HDD in accordance with embodiments of the present invention.

Embodiments in accordance with the present invention relate to a method for an erase process on a recording surface of a disk and a disk drive apparatus and, more particularly, to a method for reading servo data recorded on a recording surface with a head and erasing the same with the head.

A disk drive apparatus according to an embodiment of the present invention includes a head which reads servo data on a disk having a user data area for storing user data and which performs erasure on a recording surface of the disk in a specified position, an actuator which supports the head and moves the head, an erase process control unit which sequentially specifies target positions for the head using servo addresses, and a read/write process unit control unit which controls the actuator to sequentially move the head to the target positions specified by the erase process control unit. Since target positions for the head are sequentially specified using servo addresses, erase can be performed in a desired position on the recording surface.

The erase process control unit may refer to a table associating a data address with control information to identify a servo address associated with the data address and to associate the control information with the servo address. Further, it refers to the servo address associated with the control information in specifying the target position to perform a process using the control information according to the target position. By associating control information with a servo address, proper control can be exercised even when a target position is specified using a servo address.

As an example, the control information identifies a zone in the user data area; the servo address associated with the control information identifies a boundary of a zone associated therewith; and the erase process control unit determines whether said next target is in a zone different from the current zone in specifying the next target position from the servo address to which reference has been made and the servo address of the next target. Thus, control can be exercised in accordance with a zone.

As another example, the control information represents a management area of the recording surface in which control data including a control code is recorded; the servo address associated with the control information identifies a boundary of the management area associated therewith; and the erase process control unit determines whether the next target is in the management area in specifying the next target position from the servo address to which reference has been made and the servo address of the next target. Thus, a process can be executed in accordance with a management area.

The interval between adjoining target positions is preferably equal to or smaller than a write width of the head. As a result, unerased areas can be reduced. The head preferably performs erase using an area sandwiched between items of servo data as one unit. As a result, unerased areas can be reduced in the circumferential direction.

Another embodiment of the present invention is a method of performing an erase process on a recording surface of a disk having servo data and a user data area for recording user data. The method comprises the steps of specifying a target position using a servo address, moving the head to the specified target position, performing erase in a state in which the head is following the specified target position, specifying a next target position using a servo address after the erase, and repeating the movement of the head, the erase and the specification of a next target position to erase the recording surface. Since target positions for the head are sequentially specified using servo addresses, erase can be performed in a desired position on the recording surface.

The method may further comprise the steps of acquiring a data address and control information associated with the data address, identifying a servo address associated with the data address and associating the control information associated with the data address with the servo address, and referring to the servo address associated with the control information in specifying the next target position to perform a process using the control information according to the target position. By associating control information with a servo address, proper control can be exercised even when a target position is specified using a servo address.

In an example, the control information identifies a zone in the user data area; the servo address associated with the control information identifies a boundary of a zone associated therewith; and whether the next target is in a zone different from the current zone is determined in specifying the next target position from the servo address to which reference has been made and the servo address of the next target. Thus, a process can be executed in accordance with a zone. In particular, when the next target position is in a zone different from the current zone, parameter setting is preferably made according to the different zone. Further, a seek command specifying a data track in the different zone is used in the parameter setting. As a result, the parameter setting can be made utilizing the normal function of a disk drive device.

In another example, the control information represents a management area of the recording surface in which control data including a control code is recorded; the servo address associated with the control information identifies a boundary of the management area associated therewith; and whether the next target is in the management area is determined in specifying the next target position from the servo address to which reference has been made and the servo address of the next target. Thus, a process can be executed in accordance with a management area. In particular, when the next target position is in the management area, erase is preferably skipped in the target position.

Embodiments of the present invention make it possible to position a head using servo data written on a recording surface and to erase a desired area of the recording surface.

One embodiment in accordance with the present invention will now be described. For clarity, the following description and drawings will include appropriate omissions and simplifications. In each of the drawings, like elements will be indicated by like reference numerals. For clarity of description, description on such elements may be omitted as occasion demands to avoid duplication.

An embodiment of the present invention will now be described with reference to a hard disk drive (HDD) as an example of a disk drive apparatus. The HDD in the present mode for carrying out the invention specifies a destination of seek performed by a head element unit (target address) using a servo address and performs an erase on a recording surface at the destination of seek. By specifying a destination of seek by the head element unit with reference to a servo address, a desired area on the recording surface can be erased unlike the case wherein the target address is specified with reference to a data address.

To provide an understanding of this embodiment of the present invention, a schematic description will be first made on a general configuration of the HDD. FIG. 1 is a block diagram schematically showing a configuration of an HDD 1 in the present mode for carrying out the invention. As shown in FIG. 1, the HDD 1 includes a magnetic disk 11 which is an example of a recording disk, head element units 12 which are an example of heads, an arm electronic circuit (AE: Arm Electronics) 13, a spindle motor (SPM) 14, a voice coil motor (VCM) 15, and actuators 16, provided in a sealed enclosure 10.

The HDD 1 further includes a circuit board 20 secured on the outside of the enclosure 10. On the circuit board 20, ICs are provided including a read/write channel (RW channel) 21, a motor driver unit 22, an integrated circuit including a hard disk controller (HDC) and an MPU (hereinafter referred to as HDC/MPU) 23, and a RAM 24. Those circuit features may be integrated into a single IC or packaged in the form of a plurality of separate ICs.

The magnetic disk 11 in the present embodiment is a magnetic disk of the perpendicular magnetic recording type, and recording is performed with recording magnetization oriented in a direction perpendicular to a recording surface thereof. The magnetic disk 11 is secured to the SPM 14. The SPM 14 rotates the magnetic disk 11 at a predetermined angular velocity. The motor driver unit 22 drives the SPM 14 according to control data from the HDC/MPU 23. Each head element unit 12 is secured to a slider (not shown). The slider is secured on a tip of the actuator 16. The actuator 16 is connected to the VCM 15 and is swung about a swing axis to move the head element unit 12 (and the slider) above the rotating magnetic disk 11 in the radial direction thereof. The motor driver unit 22 drives the VCM 15 according to control data from the HDC/MPU 23 (referred to as DACOUT in the present specification).

The head element units 12 include a write element for converting an electrical signal into a magnetic field according to data to be recorded on the magnetic disk 11 (write data) and a read element for converting a magnetic field from the magnetic disk 11 into an electrical signal. One or more magnetic disks 11 may be provided, and a recording surface may be formed on one side or both sides of the magnetic disk 11.

The AE 13 selects one head element unit 12 to access the magnetic disk 11 from among the plurality of head element units 12, amplifies (pre-amplification) a reproduction signal reproduced by the selected head element unit 12 with a predetermine gain, and transmits the signal to the RW channel 21. Also, the AE 13 transmits the recording signal from RW channel 21 to the selected head element unit 12. The RW channel 21 amplifies a read signal supplied by the AE 13 to a predetermined amplitude, extracts data from the read signal thus acquired, and performs a decode process on the same. The read data includes user data and servo data. The decoded user data is supplied to the HDC/MPU 23. The RW channel 21 performs code-modulation of write data supplied from the HDC/MPU 23 and further converts the code-modulated write data into a write signal which is then supplied to the AE 13.

The MPU of the HDC/MPU 23 operates according to codes loaded in the RAM 24. In addition to the codes operating on the MPU, with activation of the HDD 1 the RAM 24 is loaded with data required for control and data processing from the magnetic disk 11 or a ROM (not shown). The HDC/MPU 23 executes control over a read/write process, management of a command execution sequence, positioning control (servo control) of the head element units 12 using a servo signal, interface control, required processes associated with data processing such as defect management, and control over the HDD 1 as a whole. The HDC/MPU 23 in the present embodiment executes an erase process on each recording surface of the magnetic disk 11. A detailed description will follow on this point.

Figure 2:
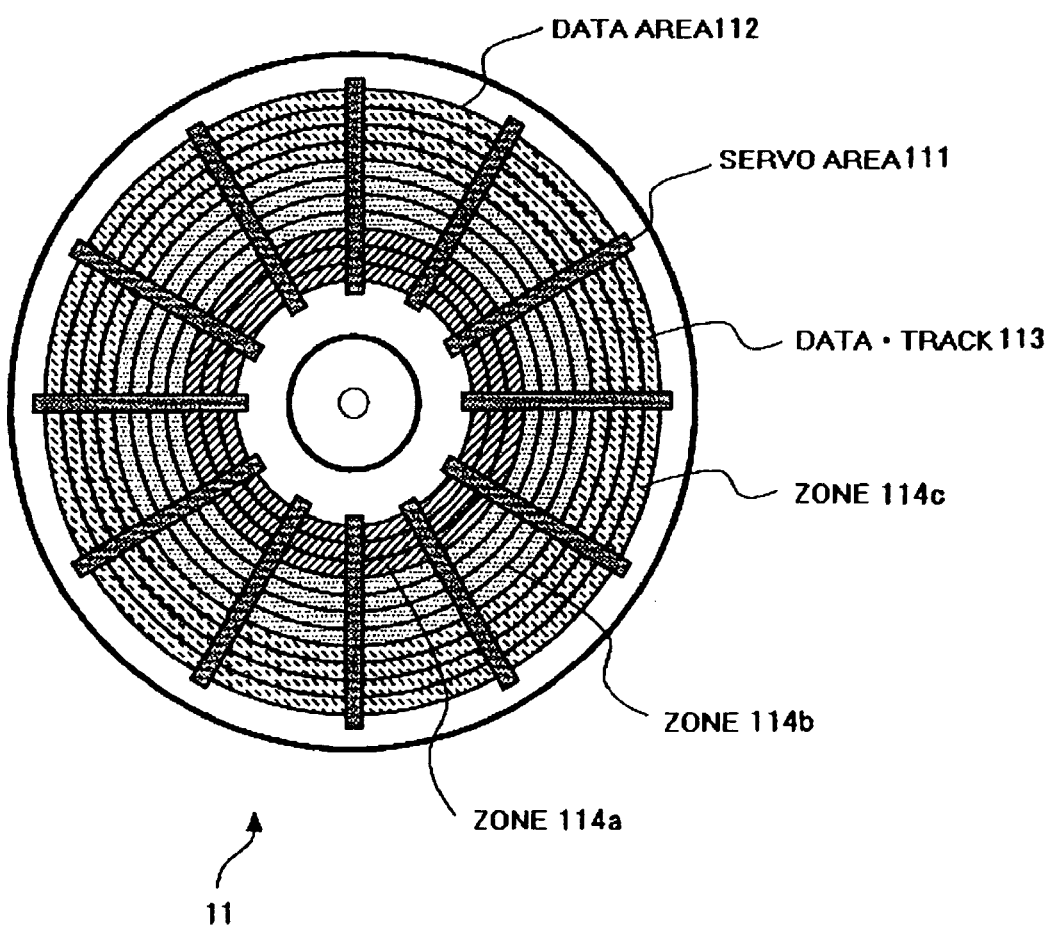
FIG. 2 is a schematic illustration of a state of recording data on a recording surface of a magnetic disk.

Recording data on the magnetic disk 11 will be described with reference to FIG. 2. As shown in FIG. 2, a recording surface of the magnetic disk 11 has a plurality of servo areas 111 extending from the center of the magnetic disk 11 in the radial direction of the same and formed at intervals each defining a predetermined angle, and a data area 112 which is formed between each pair of adjoining servo areas 111. Servo data for controlling the positioning of the head element units 12 is recorded in each servo area 111.

The data area 112 includes a user data area for recording user data and a management area for recording control data of the HDD 1. A plurality of data tracks 113 having a predetermined width in the radial direction and in the form of concentric circles are formed on the recording surface of the magnetic disk 11. The user data is recorded along the data track. One data track has a plurality of data sectors (recording units of the user data).

The data tracks are grouped into a plurality of zones 114a to 114c according to their positions in the radial direction of the magnetic disk 11. FIG. 2 shows three zones 114a to 114c by way of example. Each zone has a different recording frequency, and the number of data sectors included in one data track is set for each zone. Similarly, the magnetic disk 11 has a plurality of servo tracks having a predetermined width in the radial direction and formed like concentric circles. Each servo track is constituted by a plurality of items of servo data separated from each other by the data areas 112.

Figure 3:
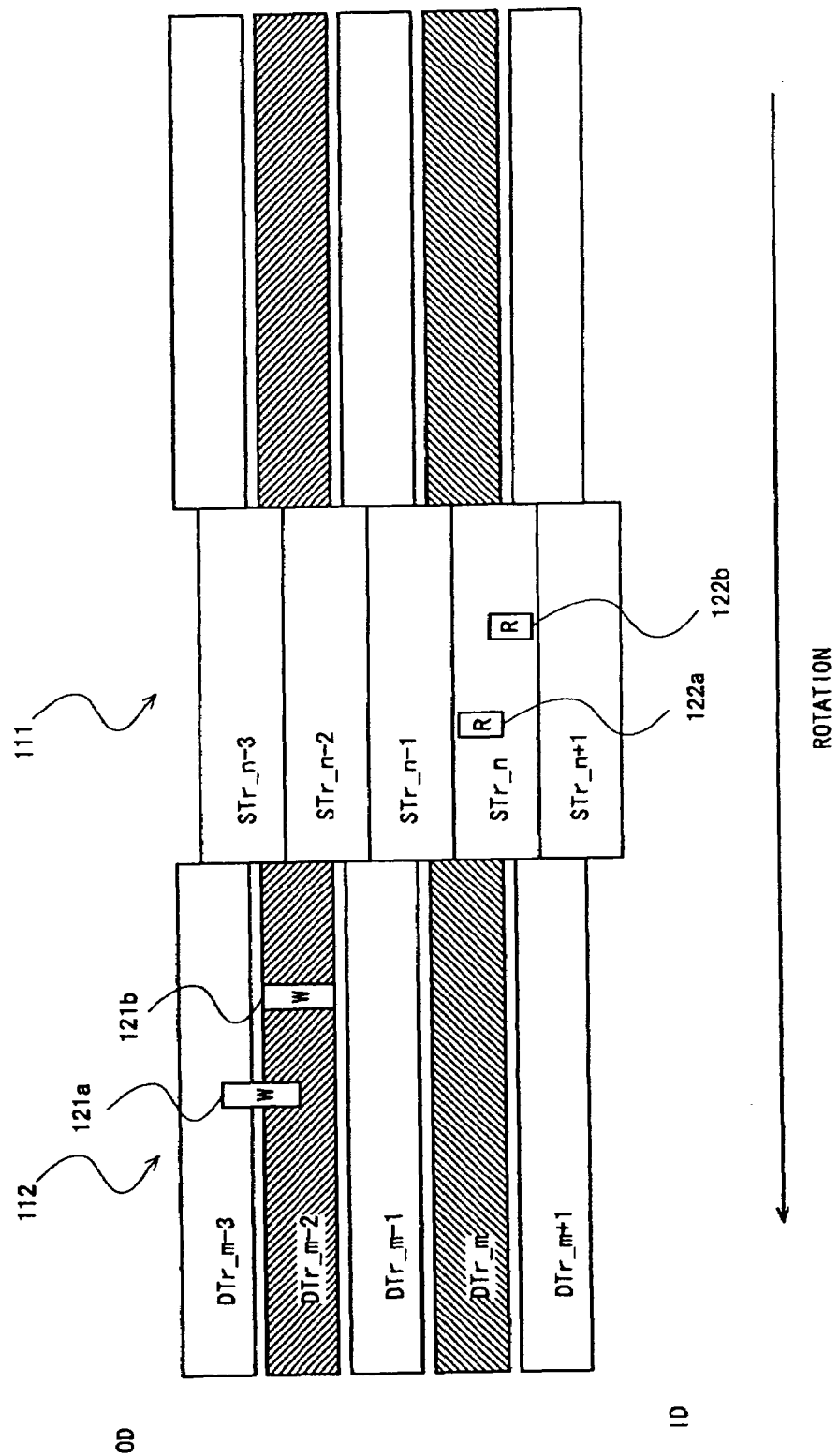
FIG. 3 is a schematic illustration of the positions of a write element and a read element at the time of data reading and at the time of data writing in accordance with embodiments of the present invention.

FIG. 3 schematically shows part of the data areas 112 and the servo areas 111. On the magnetic disk 11 in accordance with embodiments of the present invention, data is recorded according to an adaptive format having a data track pitch and a servo track pitch different from each other. The dimensional relationship between the data track pitch and the servo track pitch depends on the design of the HDD 1, and the relationship may be different on each of magnetic disks in the same HDD 1.

FIG. 3 also schematically shows the positions of a write element 122 and a read element 121 at the time of data reading and at the time of data writing. In this example, when a head element unit 12 is located above the magnetic disk 11, the write element and the read element are in positions different from each other in the radial direction. The difference (distance) between the positions of the write element and the read element in the radial direction is referred to as a read/write offset.

Referring to FIG. 3, a write element position 121a and a read element position 122a represent the position of the head at the time of data reading, and a write element position 121b and a read element position 122b represent the position of the head at the time of data writing. The radial dimensions of the rectangles indicated by 121 and 122 correspond to a write width and a read width, respectively. A write width is the radial dimension of an area in which data is written by the write element, and a read width is the radial dimension of an area from which data is read by the read element.

Referring to FIG. 3, the read element 122a is positioned in a position to read a data track DTr_m. The read element 112b is positioned in a position for allowing the write element 121b to write user data in a data track DTr_m-2. The targets of both of the read from the data track DTr_m and the write in the data track DTr_m-2 have servo addresses which are located on a servo track STr_n and which are in different positions in the servo track STr_n.

When the data track pitch and the servo track pitch are different from each other as thus described, a target position of the head element unit 12 is not always at the center of a servo track, and each target position becomes a different position in a servo track. For this reason, it is required to use different bursts in accordance with the target position in order to control the positioning of the head element unit 12. FIG. 3 schematically shows each element, and the dimensions and positional relationships do not precisely reflect those of an actual product.

The HDD 1 in the present embodiment executes an erase process on each recording surface of the magnetic disk 11. In the case of a perpendicular magnetic recording type HDD, a DC erase area on a recording surface adversely affects data reading by the read element 122. A magnetic field of the DC erase area constitutes a disturbance to the read element 122, and the SER of a read signal is significantly decreased. In particular, in the case of self servo write in which servo data is written in a magnetic disk 11 using a machine or mechanism in an HDD, a problem occurs in perpendicular magnetic recording type HDD because it is typical of the process to perform DC erase on a recording surface of the disk. The HDD 1 in the present embodiment transforms a DC erase area into an AC erase area by performing an AC erase process on the recording surface using the head element unit 12. The AC erase is to write a pattern having a predetermined frequency on the recording surface. Typically, the frequency is constant, and the highest frequency that the head element unit can write is chosen.

It is important that the HDD 1 perform AC erase in as many areas having user data recorded therein as possible. As shown in FIG. 3, the data track pitch is greater than the write width of the write element 121. For this reason, it is possible to prevent the occurrence of a squeeze attributable to a swing of the head element unit 12 during positioning. However, DC erase areas remain between data tracks for the same reason even when the write element 121 is positioned at the centers of the data tracks. In order to improve the SER of a read process, it is required to perform AC erase in such areas between data tracks in addition to the data tracks.

The HDD 1 in the present embodiment sequentially positions the head element unit 12 with reference to servo tracks and performs erase with the write element 121 in the positions reached by the positioning. A target position is specified by a servo address, and the head element unit 12 is moved to the position. Erase is performed on the recording surface with the head element unit 12 following the target position. When one circular erase is finished in the target position, an erase track is formed. A next target position is then specified by a servo address, and the head element unit 12 is moved to the same. The process is repeated. Specifically, the HDD 1 sequentially seeks target positions with the head element unit 12 (read element 122) at one-half the servo track pitch and performs erase along one circle on the magnetic disk with the write element 121 with the head element unit 12 (read element 122) positioned in the target positions.

Since the write width is greater than the servo track pitch, AC erase can be performed in all data tracks and all areas including the areas between the data tracks where user data is recorded by repeating the above-described process. Although it is preferable to sequentially move the head element unit 12 at one-half the servo track pitch in the same radial direction in order to perform the AC erase reliably and efficiently, no unerased area will remain in the radial direction in practice because the intervals between adjoining target positions are equal to or smaller than the write width. The head element unit 12 may alternatively be moved at a pitch smaller than one-half the servo track pitch. In consideration to the simplicity of the control over the process and the efficiency of the process, it is preferable to perform the AC erase sequentially in the same direction in target positions at a constant pitch.

Figure 4A:
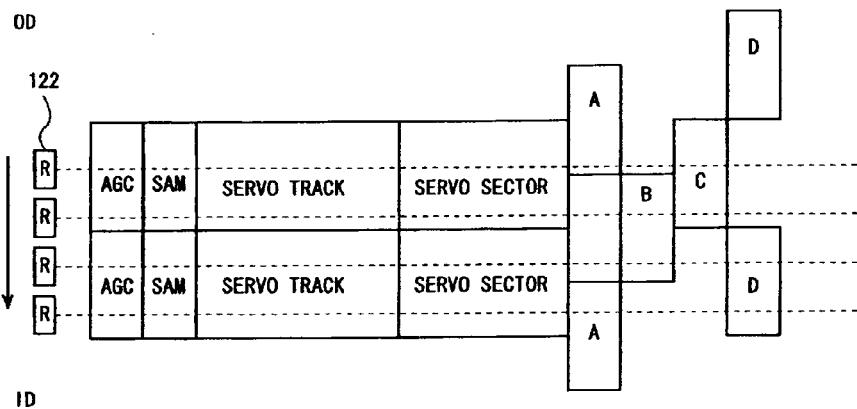
FIGS. 4(a) and 4(b) are schematic illustrations of a data format of servo data and a method of moving the read element (head element unit) at a erase process in accordance with an embodiment of the present invention.

In the example in FIG. 4(a), the read element 122 is sequentially moved one-half the servo track pitch at a time from the side of the outer circumference (OD) toward the inner circumference (ID) and, consequently, the write element 121 is also moved substantially in the same manner. Because the read element 122 moves at one-half the servo track pitch, it makes two circular movements in different positions in the same servo track. The HDD 1 specifies a target using a servo address to seek it accurately at one-half the servo track pitch.

A servo address is represented using a servo track ID (servo track umber), a servo sector ID (servo sector number), and a PES (position error signal). A servo address in the radial direction of the magnetic disk 11 is identified by a servo track ID and a PES. In the present specification, "servo address" means an address based on servo data and implies an address represented by some or all of the above-described three address elements.

Servo addresses will now be described. As shown in FIG. 4(a), each item of servo data includes servo AGC (Auto Gain Control; AGC), a servo address mark (SAM), a servo track ID (SERVO TRACK) constituted by a Gray code and identifying a servo track, a servo sector ID (SERVO SECTOR) identifying a servo sector in a servo track, and a burst pattern for minute position control.

The HDD 1 determines a gain value for the AGC using an amplitude read by the servo AGC. The SAM gives timing for servo data processing by the RW channel 21. A servo track number identifies each servo track, and a servo sector ID identifies each servo sector in a servo track.

Figure 4B:
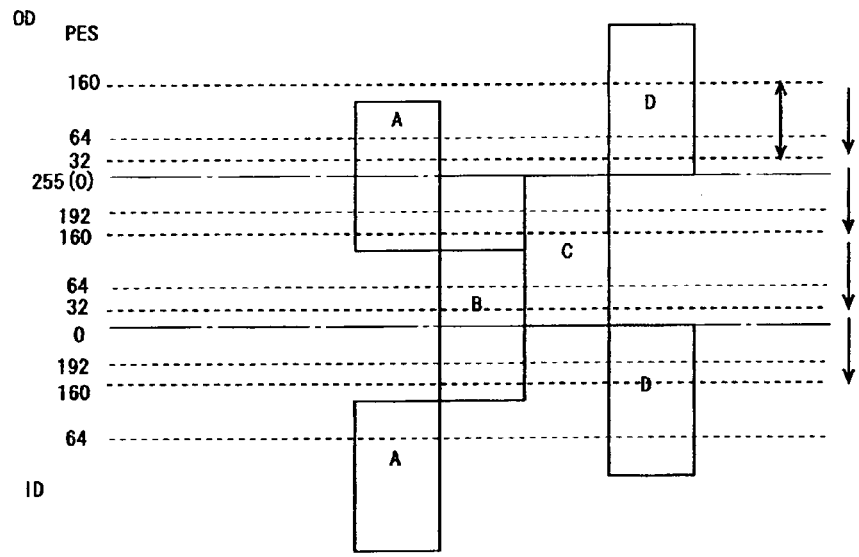

A burst pattern is constituted by four bursts A, B, C, and D which are in different positions in the circumferential direction and in the radial direction. The bursts are arranged such that the bursts A, B, C, and D are located in the order listed from the inner circumference side. The relative positions of bursts in a servo track can be determined from the amplitude of a reproduction signal from each of the bursts. As shown in FIG. 4(b), in the present embodiment, positions in a servo track are indicated by PES values representing 256 divisions in the radial direction. That is, a position in the radial direction is represented by a servo track ID and a PES value.

In the example in FIG. 4(b), the end of a servo track on the inner circumference (ID) side thereof is represented by PES0, and the end of the same on the outer circumference (OD) side is represented by PES255. PES0 and PES256 of adjoining servo tracks represent the same position. The center of each servo track is PES 128. A PES is determined based on a burst pattern. Specifically, the HDD 1 in the present embodiment exercises positioning control using a main PES (MPES) calculated using a burst A and a burst B and a secondary PES (SPES) calculated using a burst C and a burst D.

An MPES is calculated using |A−B|/(A+B). An SPES is calculated using |C−D|/(C+D). Each of the alphabets represents a read amplitude value of the burst. The HDC/MPU 23 changes the PES to be used according to the position of the head. Specifically, the HDC/MPU 23 uses an MPES when a target servo address read by the head element unit 12 is in the range between PES64 to PES192. The HDD 1 uses an SPES when the read servo address is in a range other than the same.

The bursts employed are changed at 64PES and 192PES, and the relationship between a PES and a physical amount of movement in the neighborhood of those values is different from that in other regions. That is, a distortion of the relationship exists. Specifically, the rate of a change in the physical amount of movement relative to the amount of a change in PES increases in the vicinity of 64 PES and 192 PES, which reduces the stability of positioning. For this reason, in the present embodiment, the head element unit 12 is sequentially moved in each servo track toward 32PES and 160PES, which are apart from those PES values, as target servo addresses. There is an interval of 128PES between the 32PES and 160PES, and the interval agrees with one-half the servo track width.

As described above, the HDD 1 in the present embodiment positions the head element unit 12 with reference to a servo address. At a normal read process and write process, the HDD 1 receives a specification of a position to access from a host 51. Typically, the HDD 1 specifies a position to access with an LBA (Logical Block Address). Other types of known data addresses include CHSs (Cylinder Head Sectors). A data address represents an address of a user data, and it is an address to be accessed with reference to a data track.

The HDD 1 converts a target position specified by a data track position into a target position in terms of servo address, and seeks and follows the same while reading the servo address with the head element unit 12. Therefore, the HDD 1 performs defect management and control over circuit parameter setting using data addresses. In the present specification, data addresses include LBAs and CHSs and addresses represented by only part of an LBA or CHS.

For example, the condition of data recording varies between zones of the magnetic disk 11, and the HDD 1 therefore sets the parameters of the RW channel 21 and AE 12 for each zone. In the case of an erase process, the HDD 1 is similarly required to set parameters in accordance with a zone change. However, a table indicating a zone boundary is specified by a data addresses (a data track). An erase process performs AC erase in areas in which user data is recorded, and the process must skip a management area for saving control data including codes for controlling the HDD 1. However, a table identifying the management area is similarly identified by a data track.

An erase process in the present embodiment directly specifies a target address using a servo address. Therefore, each zone or management area cannot be directly identified by a table that is constituted by a data track. Although the HDD 1 has the function of calculating a servo address from a data track number (data address) to perform a normal read process or write process, it does not carry out the calculation in reverse. Further, since the HDD 1 in the present embodiment employs an adaptive format as described above, a data track number cannot be easily identified from a servo address, and it is difficult to perform such calculation while executing an erase process with the head element unit 12.

Under the circumstance, at an erase process in the present mode, a management table configured based on servo addresses is generated from a management table configured based on data tracks before actual erase is started on a recording surface. At the erase process, the HDD 1 executes parameter setting in accordance with the zone and skips a management area with reference to the management table based on servo addresses.

Figure 5:
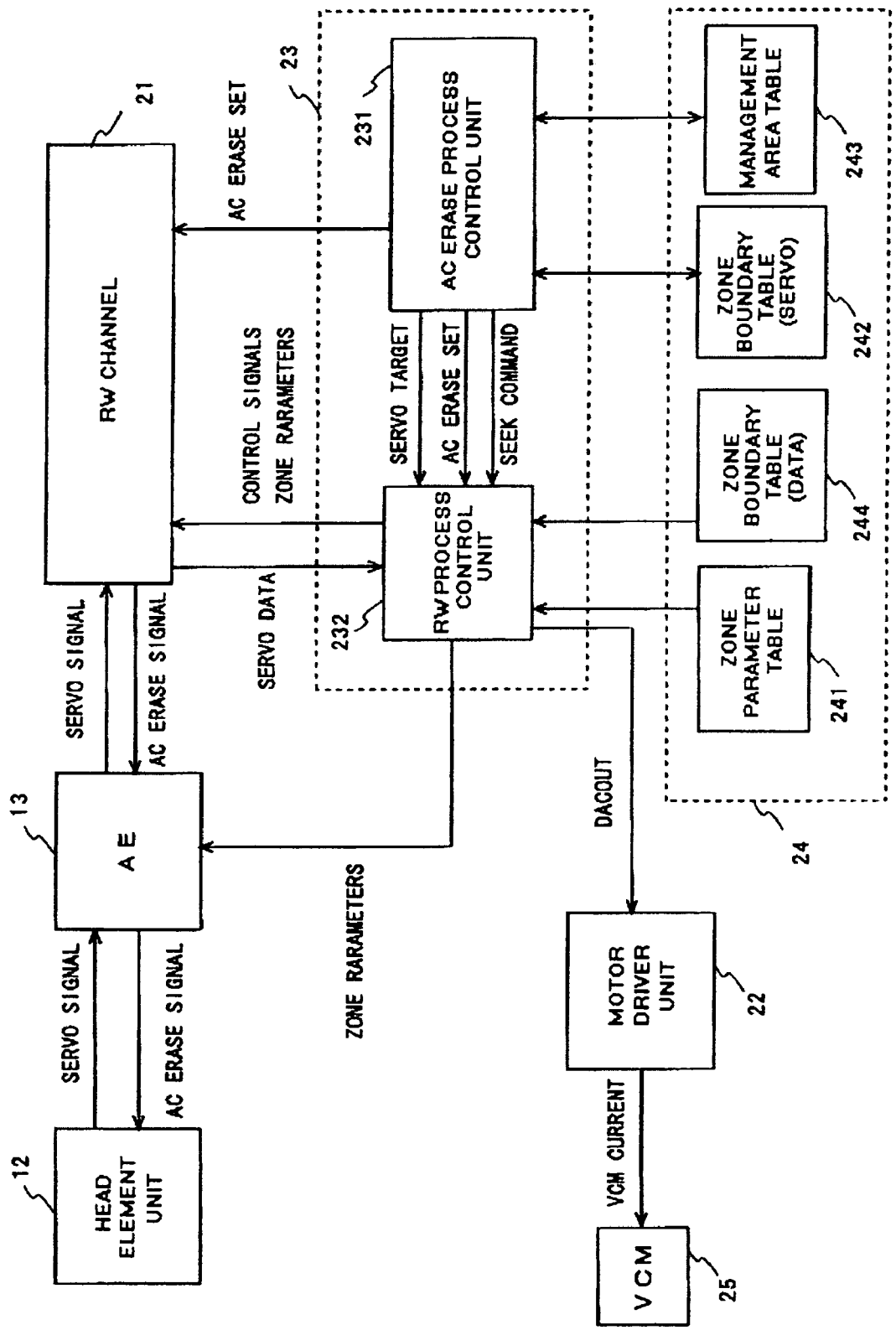
FIG. 5 is a block diagram schematically showing logic elements associated with the erase process in accordance with embodiments of the present invention.

FIG. 5 is a block diagram schematically showing elements associated with an erase process in the present embodiment. An AC erase process control unit 231 controls an erase process on each recording surface of the magnetic disk 11. The AC erase process control unit 231 is packaged as a logical element of the HDC/MPU 23, and the MPU of the HDC/MPU 23 operates according to a code to function as the AC erase process control unit 231. Alternatively, the AC erase process control unit 231 may be constituted by part of the hardware configuration of the HDC/MPU 23 and an MPU operating according to a code.

An RW process control unit 232 is a logical element controlling the execution of a normal read and write process in the HDD 1. In the present embodiment, the RW process control unit 232 exercises positioning control over the head element unit 12 at an erase process and controls the execution of actual erase on a recording surface and the like according to instructions from the AC erase process control unit 231. The RW process control unit 232 is constituted by part of the hardware configuration of the HDC/MPU 23 and an MPU operating according to a code.

When an erase process is started, the AC erase process control unit 231 generates a zone boundary table 242 based on servo addresses and a management area table 243 based on servo addresses. The zone boundary table 242 is a table identifying the boundary of each zone. FIG. 6(*b*) shows an example of the zone boundary table 242 based on servo addresses. The AC erase process control unit 231 generates the zone boundary table 242 based on servo addresses from a zone boundary table 244 based on data tracks, which is shown in FIG. 6(*a*), utilizing the function of the RW process control unit 232.

As shown in FIG. 6(*b*), the zone boundary table 242 based on servo addresses includes zone numbers identifying each zone, which is an example of control information, and servo track numbers associated with the same. Each servo track number represents the maximum servo track number in the respective zone. It is therefore the outermost servo track number of the zone when the servo track number increases from the inner circumference side toward the outer circumference side. As shown in FIG. 6(*a*), the zone boundary table 244 based on data tracks includes zone numbers and maximum data track numbers associated with the same. Other servo addresses may be used to identify zone boundaries.

As described above, the RW process control unit 232 calculates a servo address from a data address at a normal read/write process. The AC erase process control unit 231 passes each data track number to the RW process control unit 232 and acquires a servo track number associated with the same. Thus, the zone boundary table 242 based on servo addresses can be easily generated.

FIG. 7 shows an example of the management area table 243 based on servo addresses. Similarly to the zone boundary table 242, the AC erase process control unit 231 generates the management area table 243 based on servo addresses from a management area table based on data tracks (not shown) using the address conversion function of the RW process control unit 232. The management area table 243 includes data (ID) identifying an inner circumferential boundary of a management area, which is an example of control information, and a servo track number (SERVO TRACK_ID) associated with the same. It further includes data (OD) identifying an outer circumferential boundary of the management area, which is an example of control information, and a servo track number (SERVO TRACK_OD) associated with the same.

Referring again to FIG. 5, when the AC erase process control unit 231 generates the zone boundary table 242 and the management area table 243, AC erase on each recording surface is started. The AC erase process control unit 231 specifies a servo address to serve as a target (SERVO TARGET) and instructs the RW process control unit 232 to perform AC erase in the target position. The RW process control unit 232 causes the head element unit 12 to seek the target servo address using a servo address (SERVO DATA) acquired from the head element unit 12 through the AE 13 and the RW channel 21. Specifically, the value of a VCM current (VCM CURRENT) to be passed through the VCM 15 is determined from the target servo address and the current servo address thus acquired, and control data representing the same (DACOUT) is output to the motor driver unit 22.

In the state in which the head element unit 12 is positioned at the target position, the RW process control unit 232 instructs the RW channel 21 to perform AC erase in that position using control signals (CONTROL SIGNALS). The RW channel 21 outputs AC erase signals to the AE 13 for the period in which it is instructed by the RW process control unit 232. The RW channel 21 in the present embodiment performs AC erase for which one servo sector serves as one unit. A detailed description will follow on this point.

When one circular erase is finished in the target position of the magnetic disk 11, as described with reference to FIG. 4(*b*), the AC erase process control unit moves the head element unit 12 by one-half of the servo track pitch. Thereafter, the seek, positioning, and erase of the head element unit 12 are repeatedly executed to continue erase of user data areas.

When the next target servo address to be sought is located in a zone different from the current zone, the HDD 1 is required to perform a process of setting new parameters (parameter updating). Before the next target position is sought, the AC erase process control unit 231 refers to the zone boundary table 242 to check whether the next target servo address is in a zone different from the zone in which the head is currently located. When the next target servo address is in the same zone as the current zone, the AC erase process control unit 231 maintains the seek instruction as it is.

When the next target servo address is in a zone different from the current zone, the AC erase process control unit 231 executes a zone change process. Specifically, the AC erase process control unit 231 specifies a data track address in the next zone and instructs the RW process control unit 232 to seek the same. The RW process control unit 232 has the function of setting parameters associated with a destination zone when there is a zone change, as a normal function.

Since the RW process control unit 232 normally operates using addresses in data tracks, it cannot determine a zone boundary by seek using a servo address. However, by instructing the RW process control unit 232 to seek using a data track address, the parameter setting function of the RW process control unit 232 can be utilized. By using the normal function of the RW process control unit 232 as thus described, the code size and developing period of the AC erase process control unit 231 can be reduced.

Specifically, when the seek instruction using a data track address is received from the AC erase process control unit 231, the RW process control unit 232 refers to the zone boundary table 244 based on data addresses to check the zone to be sought. Further, the RW process control unit 232 refers to a zone parameter table 241 to acquire a parameter set associated with the zone at the destination.

As shown in FIG. 8, the zone parameter table 241 includes zone numbers identifying zones and parameter sets associated with the zone numbers. Parameters set by the RW process control unit 232 include a filter coefficient of the RW channel 21 and a write current value of the AE 13. The RW process control unit 232 stores parameter values (PARAMETER SET) in registers of the RW channel 21 and the AE 13.

When the setting of the parameters associated with the zone is completed, the RW process control unit 232 specifies the servo address at an end of the new zone as a target and instructs the RW process control unit 232 to perform AC erase. As described above, the HDD 1 repeats head seek to the target position, following, and erase. When the head element unit 12 thereafter reaches the next zone boundary, processes similar to those described above are performed to set parameters.

In addition to zone boundaries, the AC erase process control unit 231 executes the detection of a management area and the process of skipping the same. At a normal read/write process, a data address specified as a target does not resides in a management area. However, in the case of the erase process in the present embodiment, since the head element unit 12 is moved by specifying a servo address, a management area may be erased. When the next position to be sought is in a management area, the AC erase process control unit 231 causes the head element unit 12 to pass through that position.

Specifically, prior to the seek, the AC erase process control unit 231 refers to the management area table 242. The AC erase process control unit 231 determines whether the next target servo address resides between servo addresses SERVO TRACK_ID and SERVO TRACK_OD representing boundaries of a management area. If the target servo address is in the management area, instead of seeking it, the AC erase process control unit 231 specifies the servo track spaced ahead of the address by the number of servo tracks in the management area as the next target servo address. Thus, the erasure of the management area is prevented using servo address control.

At an erase process in the present embodiment, erase on a recording surface is performed using one servo sector as a unit instead of one data sector. A servo sector corresponds to the area between one servo data and the next servo data. FIG. 9(a) schematically shows a normal state of recording of a data sector, and FIG. 9(b) schematically shows a state of erase on a recording surface in the present embodiment.

The HDD 1 records user data in units constituted by data sectors (DATA SECTOR). Each data sector is constituted by a plurality of sections including, sections of a sync pattern (SYNC), a data address mark (DAM), user data, and an ECC (Error Correction Code). The sync pattern is a signal for achieving clock synchronization, and the data address mark indicates the position at which the user data starts.

Typically, a plurality of data sectors exist between servo data (SERVO). There are gaps between the data sectors, and no data is recorded there. Each servo sector includes data other than the user data and ECC. When AC erase is performed by writing patterns for AC erase instead of user data using a data sector as a unit, the areas between the data sectors and the areas of the data address marks and so on will remain without being AC-erased.

Under the circumstance, the HDD 1 in the present embodiment performs AC erase using an area between items of servo data as one unit. The HDD 1 writes patterns for AC erase such that a gap between items of servo data constitutes one AC erase sector (AC ERASE SECTOR). Thus, substantially all areas between items of servo data in the circumferential direction can be AC-erased.

Referring to FIG. 5 again, specifically, the AC erase process control unit 231 makes a setting for AC erase (AC ERASE SET) in the RW channel 21 and the RW process control unit 232 before starting AC erase on a recording surface. When the AC erase setting is made, the RW channel 21 and the RW process control unit 232 write AC erase patterns using one servo sector as a unit unlike a normal data write. The RW channel 21 generates the AC erase patterns internally and outputs the AC erase patterns according to control signals from the RW process control unit 232 such that the gap between adjoining items of servo data constitutes one AC erase sector.

While an embodiment of the present invention has been described above, the invention is not limited only to the above-described embodiments for carrying out the same, and various modifications may be made as long as they will not depart from the spirit of the invention. For example, while embodiments of the present invention are suitable for HDDs, they may be applied to other disk drive apparatus utilizing a recording disk. While embodiments of the present invention are advantageously used especially for AC erase in the case of perpendicular magnetic recording as described above, there is no limitation on the application of the invention to a DC erase process in the case of in-plane recording and the like.

While embodiments of the present invention are advantageous for erase on a disk recorded using an adaptive format, embodiments of the invention may be applied to erase on a recording surface having a format other than the same. Embodiments of the invention may also be applied for erase of part of a user data area. Although it is preferable to sequentially move the head element unit in the same radial direction, other methods of movement may be employed.

For data other than the zone boundaries and management area boundaries described above, a new correspondence table may be generated based on servo addresses. A table associating zone parameters instead of zone boundaries with servo addresses may be generated. While the boundaries of a management area are identified by servo track numbers in the above description, the boundaries may be identified by servo addresses including PESs.

What is claimed is:

1. A disk drive apparatus including:
a head which reads servo data on a disk having a user data area for storing user data and which writes according to a write width and performs an erase process on a recording surface of said disk in a specified position;
an actuator which supports said head and moves the head;
an erase process control unit which sequentially specifies target positions for said head using servo addresses; and
a read/write process unit control unit which controls said actuator to sequentially move said head to the target positions specified by said erase process control unit;
wherein said erase process control unit refers to a table associating a data address with control information to identify a servo address associated with the data address and to associate said control information with the servo address and further refers to the servo address associated with said control information in specifying said target position to perform the erase process using said control information according to the target position.

2. A disk drive apparatus according to claim 1, wherein:
said control information identifies a zone in said user data area;
the servo address associated with said control information identifies a boundary of a zone associated therewith; and
said erase process control unit determines whether said next target is in a zone different from the current zone in specifying said next target position from the servo address to which reference has been made and the servo address of the next target.

3. A disk drive apparatus according to claim 1, wherein:
said control information represents a management area of said recording surface in which control data including a control code is recorded;
the servo address associated with said control information identifies a boundary of said management area associated therewith; and
said erase process control unit determines whether said next target is in said management area in specifying said next target position from the servo address to which reference has been made and the servo address of the next target.

4. A disk drive apparatus according to claim 1, wherein the interval between adjoining target positions is equal to or smaller than the write width of said head.

5. A disk drive apparatus according to claim 1, wherein said head performs erase using an area sandwiched between items of servo data as one unit.

6. A method of performing an erase process on a recording surface of a disk having servo data and a user data area for recording user data, the method comprising the steps of:

specifying a target position using a servo address;
moving a head to said specified target position, the head configured to write according to a write width;
performing the erase process in a state in which said head is following the specified target position;
specifying a next target position using a servo address after said erase process; and
repeating the movement of said head, the erase process, and the specification of a next target position to erase said recording surface, the method further comprising the steps of:
acquiring a data address and control information associated with the data address;
identifying a servo address associated with said data address and associating the control information associated with the data address with the servo address; and
referring to the servo address associated with said control information in specifying said next target position to perform the erase process using said control information according to the target position.

7. A method according to claim 6, wherein:
said control information identifies a zone in said user data area;
the servo address associated with said control information identifies a boundary of a zone associated therewith; and
whether said next target is in a zone different from the current zone is determined in specifying said next target position from the servo address to which reference has been made and the servo address of the next target.

8. A method according to claim 7, wherein when said next target position is in a zone different from the current zone, parameter setting is made according to the different zone.

9. A method according to claim 8, wherein a seek command specifying a data track in said different zone is used in said parameter setting.

10. A method according to claim 6, wherein:
said control information represents a management area of said recording surface in which control data including a control code is recorded;
the servo address associated with said control information identifies a boundary of said management area associated therewith; and
whether said next target is in said management area is determined in specifying said next target position from the servo address to which reference has been made and the servo address of the next target.

11. A method according to claim 10, wherein when said next target position is in said management area, erase is skipped in the target position.

12. A method according to claim 6, wherein the interval between adjoining target positions is equal to or smaller than the write width of said head.

13. A method according to claim 6, wherein erase in said following state is performed using an area sandwiched between items of servo data as one unit.

14. A method according to claim 13, wherein the interval between adjoining target positions is equal to or smaller than the write width of said head.

* * * * *